May 29, 1923.

E. P. HARLEY

SEAT

Original Filed June 7, 1921   2 Sheets-Sheet 1

1,457,245

WITNESSES

INVENTOR
E. P. HARLEY,
BY
ATTORNEYS

May 29, 1923.

E. P. HARLEY

SEAT

Original Filed June 7, 1921   2 Sheets-Sheet 2

1,457,245

WITNESSES

INVENTOR
E. P. HARLEY,
BY
ATTORNEYS

Patented May 29, 1923.

1,457,245

UNITED STATES PATENT OFFICE.

ERSKINE POLK HARLEY, OF OKLAHOMA, OKLAHOMA.

SEAT.

Application filed June 7, 1921, Serial No. 475,614. Renewed April 5, 1923.

*To all whom it may concern:*

Be it known that I, ERSKINE POLK HARLEY, a citizen of the United States, and a resident of Oklahoma city, in the county of Oklahoma and State of Oklahoma, have invented certain new and useful Improvements in Seats, of which the following is a specification.

The present invention relates in general to seats, and more particularly to an auxiliary seat for automobiles or the like.

The object of the invention is to provide a seat of this character which is highly cushioned and well ventilated, in that it is so constructed that there is a free circulation of air through the entire seat at all times, whereby the seat is both comfortable and hygienic; which is attractive in appearance; which readily adapts itself for association with automobile seats; and which is of simple, flexible and durable construction, and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1:
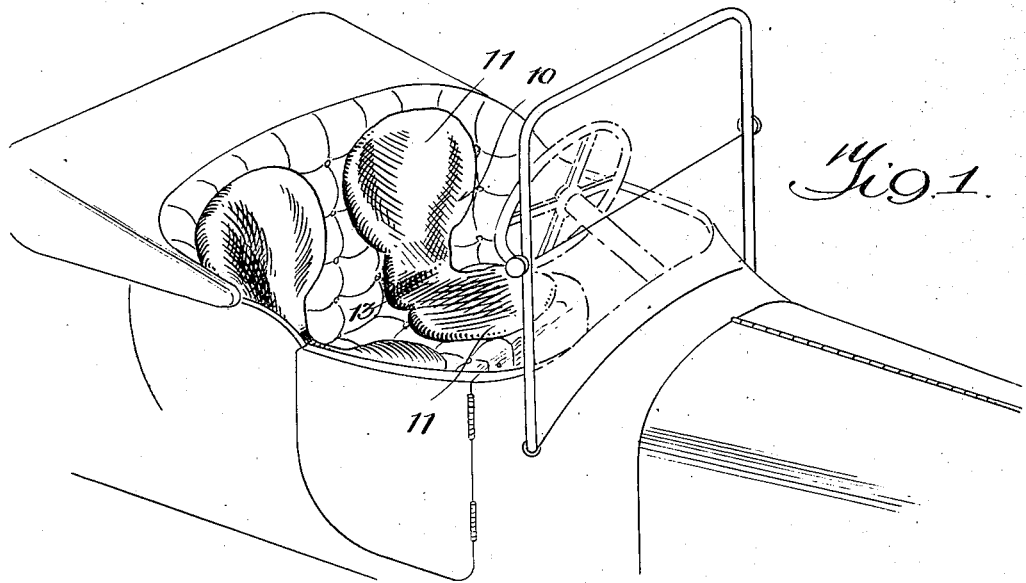
Figure 1 is a perspective view, illustrating the invention in use on automobiles.
Figure 2:
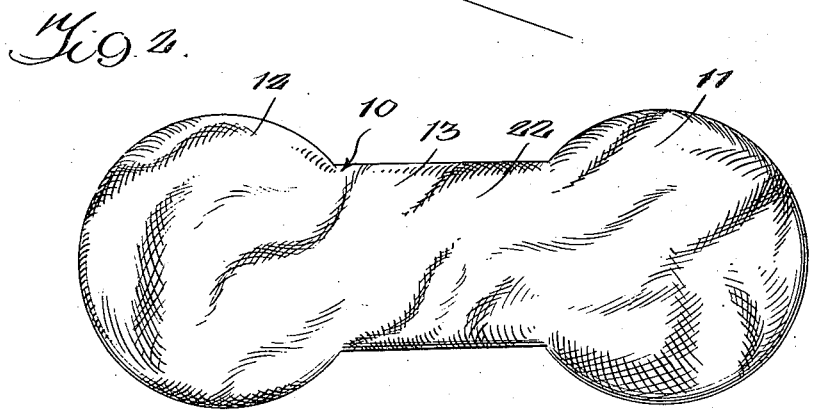
Figure 2 is a plan view of the invention prior to association with the automobile.

Referring to the drawings wherein for the sake of illustration is shown the preferred embodiment of the invention, the numeral 10 designates the seat generally which includes a seat or base portion 11, a back portion 12 and an intermediate or connecting portion 13 which serves to connect the seat or base portion with the back portion. The seat or base portion and the back portion are of identical construction, and a common description will serve for both.

Figure 5:
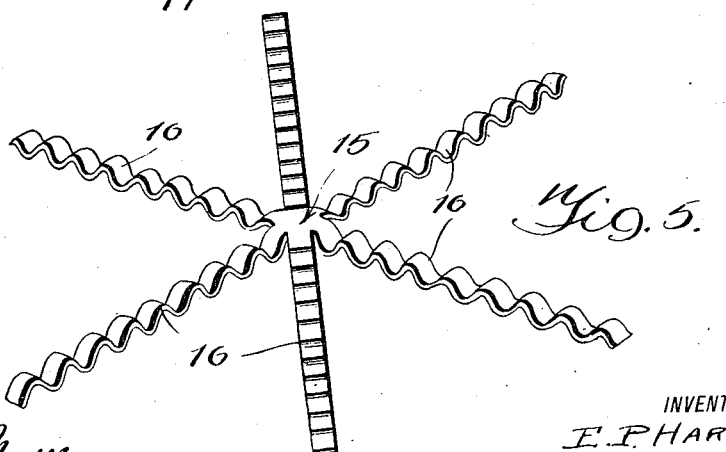
Figure 5 is a detail perspective view of the frame employed in both the seat and back portion.

The seat or base portion and the back portion each includes a frame designated generally as 15 and having a plurality, preferably six, radial arms 16, the radial arms being corrugated, as clearly shown in Figure 5. The frame and its arms are preferably constructed of light sheet metal which is yielding in character. A spirally wound coil spring 18 is associated with the frame, the convolutions of the spring being seated in the corrugations of the radiating arms. Binding elements, such as wires 19, are wound about the radiating arms and extend through the coils of the spring 18 to secure the spring in position on the frame.

This construction gives a light, yielding, strong and resilient unit in which the convolutions are maintained in a definite, predetermined relation to each other and the opposite sides of the member 20 or of the member 22 from engaging and preventing the free circulation of the air therethrough. The arms at times may be below the convolutions 18 and at other times above, as shown, depending upon which side of the member 11 or 12 is placed uppermost. I find that while the frame described has certain advantages in yieldingly maintaining or supporting the convolutions 18 in a definite pre-determined relation to each other and preventing their overlapping, that other means may be employed and accomplish the same result.

A casing 20 of wire mesh extends around both the seat or base portion and the back portion so as to completely enclose the spring, frame and binding elements and having its opposite sides held extended or separated by such elements and this casing of wire mesh constitutes the intermediate portion 13 and may be composed of a soft, yielding or a light, resilient metal.

A covering 22 of foraminous fabric completely encloses the casing of wire mesh so as to cover both the seat or base portion, the back portion and the intermediate or connecting portion. The cover 22 preferably comprises a cotton net through the meshes of which the air is free to circulate, but may consist of wicker, cane, burlap or other porous and flexible material.

In use, the auxiliary seat is disposed on the permanent seat of the automobile or the like, as clearly shown in Figure 1 and on account of its flexibility it readily adapts itself to the contour of the seat and back of the automobile under pressure of the body resting thereon, the base portion 11 resting on the base portion of the automobile seat, the back portion resting against the back thereof and the intermediate portion 13 being disposed in the corner between the back and seat portions and serving to connect the portions of the auxiliary seat. In action, the frame 15 distributes the cushioning action of the spring and this action is further and completely distributed by the action of the casing of wire mesh which though flexible is still effective to accomplish this purpose. The covering of fabric properly surfaces the seat and gives to the seat not only an attractive appearance but also further enhances its features of comfort. It is to be noted also that in use the construction and arrangement of the spring, its casing and the cover all admit and tend to produce a circulation of air whereby proper ventilation of the seat is had at all times and any moisture absorbed by the covering 22 from the clothing will be rapidly evaporated due to the free circulation of air through the interior of the members 11 and 12.

Figure 6:
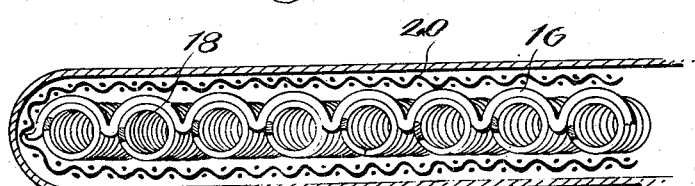
Figure 6 is a fragmentary view in longitudinal vertical section.
Figure 3:
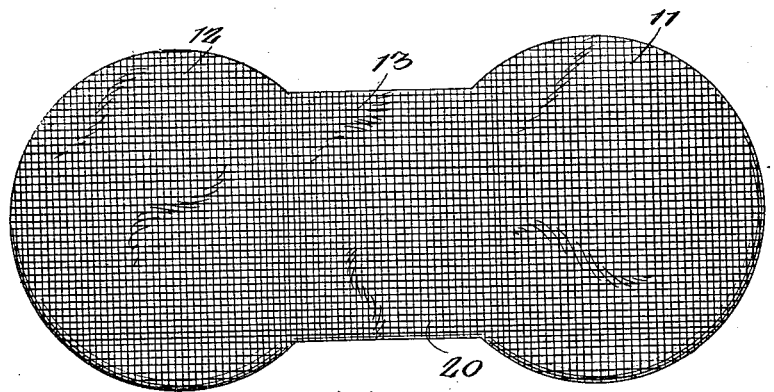
Figure 3 is a view similar to Figure 2 with the covering of the seat removed.
Figure 4:
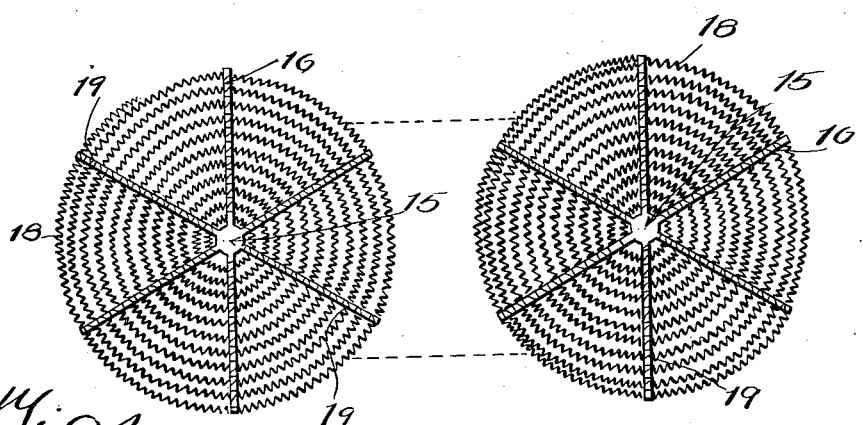
Figure 4 is a view similar to Figure 3 with the casing for the seat removed.

It will be noted in Fig. 6 that the casing 20 has its upper and lower portions or sides spaced from the members 15, 16 and 18, and this condition will be true if the casing 20 is made of a light, resilient or spring material, but this does not prevent the structure as a whole from yielding and conforming to the requirements of the body under pressure. If, however, the member 20 is of soft metal, it will probably after being subjected to pressure remain in contact with the convolutions to a greater or less degree.

There are, of course, many modifications from the preferred embodiment of my invention as herein disclosed and which will be evident to those skilled in the art, therefore, I do not wish to be limited otherwise than by my claims.

I claim:

1. An auxiliary seat for automobiles or the like comprising a base portion, a back portion and an intermediate portion, the base portion and the back portion each including a frame having a plurality of corrugated arms, a coil spring spirally wound and having its convolutions seated in the corrugations of the arms of the frame, and binding elements of wire interengaged with the coils of the spring and with the corrugations of the arms, a casing of wire mesh extending around the frame and spring of the seat portion and back portion and constituting the intermediate portion, and a covering of flexible and porous fabric completely enclosing the casing of wire mesh.

2. An auxiliary seat of the class described comprising a similarly constructed seat and back portion each consisting of a central member having corrugated radially arranged arms, a convoluted resilient element the convolutions of which are confined within the corrugations of said central members, a casing for said seat and back portions completely surrounding and joining said portions and held extended by said central members.

3. An article of manufacture comprising a similarly constructed yielding seat and back portion, each consisting of a central member having projecting arms, a convoluted, resilient element, means for securing the convolutions to the arms to maintain the convolutions in a fixed relation relative to each other, a casing for the seat and back portions surrounding and held extended by said element, and yielding means for joining the portions in folding relation to each other.

4. An article of manufacture comprising a convoluted element, means to maintain the convolutions at spaced distances and an enclosure for said element held extended by said element to allow free passage of air therethrough.

5. An auxiliary vehicle seat comprising a convoluted element and means to support the successive convolutions at equally spaced distances and an enclosure for said element and means, held extended by said element and means, to allow free passage of air therethrough.

6. An article of manufacture comprising a convoluted-coil-spring element having its convolutions positioned normally in a common plane, means to yieldingly maintain the convolutions in said plane and an enclosure for said element held extended by said element and permitting free passage of air therethrough.

7. An article of manufacture comprising a yielding convoluted-coil-spring element having its convolutions arranged in a definite, predetermined relation, a flexible enclosure for said element held extended by said element to permit the free circulation of air therethrough and means to maintain the convolutions in said predetermined relation.

ERSKINE POLK HARLEY.